United States Patent
Keppler-Ott et al.

(10) Patent No.: US 9,999,916 B2
(45) Date of Patent: Jun. 19, 2018

(54) METHOD FOR MACHINING A FUNCTIONAL PART

(75) Inventors: Thomas Keppler-Ott, Feldkirch (AT); Helmut Kirmsze, Schaan (LI)

(73) Assignee: THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 558 days.

(21) Appl. No.: 14/390,493

(22) PCT Filed: Apr. 3, 2012

(86) PCT No.: PCT/AT2012/000086
§ 371 (c)(1),
(2), (4) Date: Oct. 3, 2014

(87) PCT Pub. No.: WO2013/149271
PCT Pub. Date: Oct. 10, 2013

(65) Prior Publication Data
US 2015/0117943 A1    Apr. 30, 2015

(51) Int. Cl.
*B21J 5/02* (2006.01)
*B21K 1/76* (2006.01)
(Continued)

(52) U.S. Cl.
CPC ............... *B21J 5/025* (2013.01); *B21K 1/30* (2013.01); *B21K 1/763* (2013.01); *F16D 3/41* (2013.01);
(Continued)

(58) Field of Classification Search
CPC . B21C 23/21; B21J 5/025; B21K 1/30; B21K 1/763; F16D 3/202; F16D 3/205;
(Continued)

(56) References Cited

U.S. PATENT DOCUMENTS 2,760,797 A     8/1956   Woodling
3,975,107 A  *  8/1976   Molyneux ................. E01B 9/30
                                                 403/271
(Continued)

FOREIGN PATENT DOCUMENTS

DE     2819167 A1    11/1978
EP     0560010 A1     9/1993
(Continued)

OTHER PUBLICATIONS

German Language International Search Report for International patent application No. PCT/AT2012/000086; dated Dec. 21, 2012.
(Continued)

*Primary Examiner* — Josh Skroupa
(74) *Attorney, Agent, or Firm* — thyssenkrupp North America, Inc.

(57) ABSTRACT

A method for working a functional part, which extends in a longitudinal direction and has a lateral surface that surrounds a longitudinal central axis of the functional part running in the longitudinal direction and has an end face bounding the functional part at a free end in the axial direction, may involve pressing a punch that can be moved in the longitudinal direction of the functional part against the end face of the functional part, while the functional part is initially located in a cavity of a tool, at least over a partial portion of its longitudinal extent that adjoins its free end, which cavity is bounded in the radial direction with respect to the longitudinal central axis by a wall surface surrounding the lateral surface and lying at least partially against the lateral surface, and pulling off the tool from the functional part over the free end of the functional part over a pulling-off travel, while the punch remains pressed against the end face of the functional part, at least over a partial travel of the pulling-off travel of the tool from the functional part. A material flow of material of the functional part is brought (Continued)

about by the tool during the pulling-off of the tool from the functional part.

10 Claims, 12 Drawing Sheets

(51) Int. Cl.
*B21K 1/30* (2006.01)
*F16D 3/41* (2006.01)
*F16D 3/205* (2006.01)

(52) U.S. Cl.
CPC .... *F16D 3/2055* (2013.01); *F16D 2250/0023* (2013.01); *F16D 2300/12* (2013.01); *Y10S 464/905* (2013.01); *Y10T 29/49467* (2015.01); *Y10T 29/49647* (2015.01); *Y10T 403/7039* (2015.01)

(58) Field of Classification Search
CPC .... F16D 3/2052; F16D 3/2055; F16D 3/2057; F16D 3/40; F16D 3/42; F16D 2003/2023; F16D 2003/2026; F16D 2250/0023; Y10S 464/905; Y10T 29/49467; Y10T 29/49647
USPC .......... 464/111, 136, 905; 29/893.3, 898.042
See application file for complete search history.

(56) References Cited

U.S. PATENT DOCUMENTS

| | | | | |
|---|---|---|---|---|
| 4,310,206 A | * | 1/1982 | Weible | ............... F16C 21/005 |
| | | | | 184/105.3 |
| 6,579,186 B2 | * | 6/2003 | Fischer | ............... F16D 3/40 |
| | | | | 464/136 |
| 7,673,489 B2 | * | 3/2010 | Otaki | ............... B21C 23/20 |
| | | | | 72/353.2 |

FOREIGN PATENT DOCUMENTS

| | | |
|---|---|---|
| EP | 0891825 B1 | 9/2003 |
| JP | 10-211539 A | 8/1998 |
| JP | 2005-230907 A | 9/2005 |
| JP | 2010-137262 A | 6/2010 |
| JP | 2011-121100 A | 6/2011 |
| JP | 2010-89103 A | 11/2011 |
| WO | 2005/037459 A1 | 4/2005 |

OTHER PUBLICATIONS

English Translation of International Search Report for International patent application No. PCT/AT2012/000086; dated Dec. 21, 2012.
English abstract of US Counterpart patent No. US4274276A to DE2819167A1. Note, no English translation is available for the abstract of DE2819167A1.
English translation of the abstract of DE counterpart publication No. DE19712985 to EP0891825B1. Note, no English translation is available for the abstract of EP0891825B1.
English Abstract of JP10-211539A.
German Language Written Opinion from the International Searching Authority for International patent application No. PCT/AT2012/000086.
English Translation of the Written Opinion from the International Searching Authority for International patent application No. PCT/AT2012/000086.
English translation of abstract of JP 2010-137262 A.
English translation of abstract of JP 2010-89103 A.
English translation of abstract of JP 2011-121100 A.
English translation of abstract of JP 2005-230907 A.

* cited by examiner

METHOD FOR MACHINING A FUNCTIONAL PART

CROSS REFERENCE TO RELATED APPLICATIONS

This application is a U.S. National Stage Entry of International Patent Application Serial Number PCT/AT2012/000086, filed Apr. 3, 2012.

FIELD

The invention relates to a method for working a functional part, which extends in a longitudinal direction and has a lateral surface that surrounds a longitudinal central axis of the functional part running in the longitudinal direction and has an end face bounding the functional part at a free end in the axial direction. Furthermore, the invention relates to a component, which comprises a functional part or is formed as a whole by said functional part, the functional part extending in a longitudinal direction and having a lateral surface that surrounds a longitudinal central axis of the functional part running in the longitudinal direction and having an end face bounding the functional part at a free end in the axial direction.

BACKGROUND

In the case of many functional parts, for example spur gear wheels or bearing journals, in particular of journal crosses (=spiders) of Cardan joints, there is the general problem that it is intended to achieve a functional contour that is made as long as possible with respect to the axial direction in relation to the overall size by a production process that is as simple as possible. For example, in the case of a spur gear wheel, the toothing over a portion of the axial extent (=functional portion) of the spur gear wheel over which there are teeth with the size and shape that is at least substantially intended forms such a functional contour. In the case of a bearing journal, the lateral surface of the bearing journal over the portion of the axial extent (=functional portion) of the bearing journal in which the lateral surface is at least substantially cylindrically formed is the functional contour.

Furthermore, the functional contour is intended to have a high degree of dimensional accuracy over its axial extent, in particular with regard to a distance from the longitudinal central axis of at least one characterizing element of the functional contour remaining as constant as possible over the axial extent of the functional contour. Bearing journals are intended to have a form that is as exactly cylindrical as possible at least over a functional portion of their axial extent, that is to say the lateral surface of the bearing journal is intended to correspond at least over this region of the axial extent of the bearing journal as exactly as possible to a shell of a cylinder, in particular a shell of a circular cylinder, in order to form a good running surface for rolling bodies, in particular needles. In order to achieve a good tooth engagement, which can also transfer high loads, in the case of spur gear wheels the distance of the profile reference line, that is the line along which the tooth thickness is equal to the gap width, from the longitudinal central axis should be as constant as possible over the axial extent of the toothing.

Spur gear wheels are also known by the term spur gears or cylindrical gears. In the standard DIN 3960 of March 1987, spur gear wheels that form functional parts of the type mentioned at the beginning are described. The term "profile reference line" is defined for a spur gear wheel, as disclosed in particular by subclause 3.2 and FIG. 1 of DIN 867 from February 1986. As mentioned, the toothing forms a functional contour that extends over a functional portion of the spur gear wheel. The functional portion may comprise here part of the axial extent of the spur gear wheel or extend over the entire axial extent of the spur gear wheel. In the case of a straight-toothed spur gear wheel, it is intended that the tooth crests extend parallel to the longitudinal central axis, while in the case of helically toothed spur gear wheels they form an angle unequal to zero degrees with said axis, the distance from the longitudinal central axis in each case being intended to remain constant.

Spur gear wheels are conventionally produced by cold extrusion. The production of a spur gear wheel by cold extrusion is disclosed for example by EP 0 560 010 A1. The two dies (=mould halves) have aligned channels that run at right angles to the parting plane between the dies and into which a blank is inserted. Extrusion punches are moved through the channels against the cylindrical blank from both sides, whereby a material flow of the material of the blank takes place into radial clearances in the channels of the dies. The material flow forming the teeth consequently takes place transversely in relation to the direction in which the extrusion punches are moved. Cold extrusion, in particular transverse extrusion, is likewise conventionally used for producing journal crosses (=spiders) with bearing journals, the longitudinal central axes of the bearing journals lying in a plane and the longitudinal central axes of successive bearing journals respectively being at right angles to one another, or tripods, in which three bearing journals lie in one plane and the longitudinal central axes of said journals respectively form an angle with one another of 120°. The production of a journal cross by cold extrusion, in particular transverse extrusion, is disclosed for example by DE 2819167 A1. The two dies (=mould halves) have in turn aligned channels that run at right angles to the parting plane between the dies, are cylindrically formed here and into which a blank is inserted. Extrusion punches are moved through the cylindrical channels against the cylindrical blank from both sides, whereby a material flow of the material of the blank takes place into clearances in the dies that adjoin the cylindrical channels in the region of the parting plane and have the form of the journals to be formed. The material flow forming the journals consequently takes place transversely in relation to the direction in which the extrusion punches are moved. Here, the bearing journals form functional parts of the journal cross.

In the production of functional parts of the type mentioned at the beginning that have a functional contour by cold extrusion, at least part of the end face and/or a region of the outer surface of the functional part that lies at the transition from the lateral surface to the end face is formed by a free-form surface at a free end of the functional part. In other words, in the region of the free-form surface, the material of the functional part does not run up against a wall of the extrusion tool, that is to say a wall of one of the dies or one of the extrusion punches, during the extrusion. Such a free-form surface forms an outwardly convex elevation of the functional part. Generally, the transition between this free-form surface and the functional contour bounds the functional portion of the functional part.

In order to improve the length of the functional portion of a spur gear wheel, in EP 0 560 010 A1 a complex tooling technique and movement is proposed. To improve the dimensional stability of the functional contour, various methods for re-working the component are known in the prior art. For example, for this purpose a grinding operation or some other machining method may be carried out. Machining operations have the disadvantage, however, that they are time- and cost-intensive, and so such machining operations should be avoided as far as possible. It is known from EP 0891825 B1 in the case of bearing journals, here in particular tripods, to carry out a rolling operation for subsequent treatment after the extrusion. If desired, grooves running around the bearing journal may at the same time be introduced into the lateral surface of the bearing journal in this rolling operation.

SUMMARY

The object of the invention is to provide a functional part with improved shaping of a functional contour, it being intended that the functional part can be produced in a simple manner.

According to the invention, this is achieved by a method for working a functional part or by a component which comprises a functional part or is formed completely by said functional part.

In the case of the method according to the invention, a punch that can be moved in the longitudinal direction of the functional part is pressed against the end face of the functional part, while the functional part is initially located in a cavity of a tool, at least over a partial portion of its longitudinal extent that adjoins its free end. This cavity is bounded in the radial direction with respect to the longitudinal central axis of the functional part by a wall surface surrounding the lateral surface of the functional part and lying at least partially against the lateral surface. In this state, the tool is pulled off from the functional part over the free end of the functional part over a pulling-off travel, while the punch remains pressed against the end face of the functional part, at least over a partial travel of the pulling-off travel of the tool. A material flow of material of the functional part is thereby brought about by the tool during the pulling-off of the tool. This material flow allows an improvement of the functional contour of the functional part to be achieved. It can thus be achieved that the axial extent of the functional contour is increased and/or the dimensional stability of the functional contour over its axial extent is improved, in particular with regard to the fact that the value of a characteristic variable of the functional contour remains constant over the axial extent of the functional contour.

This process step, which serves for improving the functional contour of the functional component, may be referred to as a calibrating step.

For example, the functional part formed according to the invention may be a spur gear wheel or a bearing journal, in particular a journal cross. In the case of a spur gear wheel, the toothing over a portion of the axial extent of the spur gear wheel over which the profile reference line of the toothing has an at least substantially constant distance from the longitudinal central axis forms the functional contour. Substantially constant means here that the distance of the profile reference line from the longitudinal central axis changes by less than 3%, preferably by less than 1%. In the case of a bearing journal, the lateral surface of the bearing journal over the portion of the axial extent of the bearing journal over which the lateral surface is at least substantially cylindrically formed forms the functional contour. Substantially cylindrical means here that the diameter of the lateral surface changes by less than 3%, preferably by less than 1%.

The portion of the axial extent of the functional part over which the functional contour is present is referred to in this document as the functional portion of the functional part.

For the example where the functional part is a spur gear wheel, an increase in the length of the functional portion, that is to say that region of the axial extent of the toothing over which it has a substantially constant distance of the profile reference line from the longitudinal central axis, and/or a reduction of the change in the distance of the profile reference line from the longitudinal central axis over the axial extent of the functional portion can be achieved by the method according to the invention.

For the example where the functional part is a bearing journal, an increase in the length of the functional portion, that is to say the region of the substantially cylindrical form of the lateral surface, and/or a reduction in the deviation of the cylindrical, in particular circular-cylindrical, form of the lateral surface over the axial extent of the functional portion can be achieved by the method according to the invention.

Over the axial extent of the functional portion of the bearing journal, an interaction with a bearing element, in particular a rolling body, may be intended.

The travel over which the punch remains pressed against the end face of the functional part during the pulling-off of the tool is expediently at least 70%, preferably at least 90%, of the total pulling-off travel of the tool. This entire pulling-off travel runs from the starting position of the tool to the point at which the free end of the functional part leaves the cavity of the tool, that is to say the axial overlap between the wall surface of the tool and the lateral surface of the functional part ends. The travel over which the punch remains pressed against the end face of the functional part is advantageously less than 100% of the pulling-off travel. Consequently, the pressing force of the punch against the end face of the functional part is therefore ended at the latest shortly before the complete pulling-off of the tool.

A smoothing of the lateral surface in the functional portion can be advantageously achieved by the material flow that is brought about during the pulling-off of the tool.

In a method step carried out before the pulling-off of the tool over the pulling-off travel, the functional part is advantageously cold-extruded by means of at least one cold-extrusion punch in an extrusion tool which comprises dies. In a first configurational variant of the invention, the functional part is removed from the extrusion tool after the extrusion, whereupon a calibrating tool, which has the wall surface bounding the cavity, is pushed onto the functional part in the longitudinal direction of the functional part. The pressing of the punch against the end face of the functional part then takes place, this punch in this case being a re-working punch protruding into the cavity of the calibrating tool. The re-working punch protruding into the cavity is expediently mounted in such a way that it can be displaced by the calibrating tool. The calibrating tool preferably takes the form of a sleeve and can consequently also be referred to as a re-working sleeve.

In a second configurational variant of the invention, the cold-extruded functional part remains in the extrusion tool after the extrusion. One of the dies of the extrusion tool or both dies together then have the cavity bounded by the wall surface, which lies at least partially against the lateral surface of the functional part. The extrusion tool itself consequently forms the tool having this cavity that is subsequently pulled off from the functional part. The punch that remains pressed against the end face of the functional part, at least over a partial travel of the pulling-off travel, may in this case be one of the cold-extrusion punches or a re-working punch that is provided in addition to the at least one cold-extrusion punch and protrudes into the cavity of the extrusion tool. In the first case, the functional part extends in a longitudinal direction that lies parallel to the direction in which the at least one cold-extrusion punch is moved. In the second case, the functional part extends in a longitudinal direction at an angle thereto unequal to 0°, in particular a longitudinal direction that is at an angle thereto of 90°.

Correspondingly, the tool that is pulled off over the free end of the functional part for carrying out the calibrating step is in the first configurational variant the calibrating tool while in the second configurational variant it is represented by the extrusion tool.

The force with which the cold-extrusion punch or the re-working punch is pressed against the end face of the functional part, at least over a partial travel of the pulling-off travel of the tool, can be kept constant or changes during the pulling-off of the tool. It is particularly advantageous in this respect if, during the pulling-off of the tool, the pressing force is reduced continuously, in particular uniformly, at best in a controlled manner.

In an advantageous development of the invention, the previously mentioned re-working punch, which in the aforementioned first configurational variant protrudes into the cavity of the calibrating tool that is separate from the extrusion tool and in the previously mentioned second configurational variant protrudes into the cavity of the extrusion tool, is pressed so strongly against the end face of the functional part before the separate tool or extrusion tool is pulled off from the functional part that a plastic deformation of the functional part is brought about, with a material flow of material of the functional part. This plastic deformation of the functional part consequently acts in the sense of upsetting, that is to say the overall length of the functional part is reduced. The reduction in the overall length of the functional part is only small here (in particular less than 10% of the original total length of the functional part) and occurs substantially in the region of the free end of the functional part against which the punch is pressed. In particular, a material flow directed in the radial direction or a material flow with a component directed in the radial direction occurs in this end portion of the functional part. Furthermore, an axial material flow directed towards the free end of the functional contour of the functional part or a material flow with a component directed in this direction occurs in this end portion of the functional part and/or in a portion directly adjoining thereto of the longitudinal extent of the functional part in a radial region of the functional part that inwardly adjoins the radial position of the lateral surface of the functional part. An increase in the axial length of the functional contour can be achieved by this material flow.

During the plastic deformation with the re-working punch, in addition to the material flow in the region of the free-form surface at the free end of the functional part and in the region directly adjoining thereto, a certain material flow may also occur in other regions of the functional part. Such a material flow, which is in particular at least substantially radial, may be brought about in particular in such regions of the longitudinal extent of the functional part in which there is a gap between the lateral surface of the functional part and the wall surface of the cavity surrounding it before the pressing action is exerted by the re-working punch, a gap in which the functional part, or at least a portion of the longitudinal extent of the functional part adjoining the free end of the functional part, is arranged when the re-working punch is pressed against the end face of the functional part. In this way, influencing of the overall form of the functional contour can also be achieved. It is thus possible in particular to allow for hardening distortion that occurs during the hardening process after the shaping process; that is to say, as a result of such allowance for the hardening distortion, the dimensional stability of the functional contour of the lateral surface, at least over part of the functional part, is better after the hardening than before the hardening. Such allowance for the hardening distortion may be made with regard to the shaping in the longitudinal direction of the functional part and/or in the circumferential direction of the functional part. Hardening distortions may be caused for example by different preloads with internal stress in different regions of the functional part that form in the forming process of the functional part.

In the case of a component according to the invention, the end face of the functional part has a concave region that surrounds an elevation projecting in the longitudinal direction of the functional part. In particular, this concave region surrounds the elevation completely, that is to say in an annular manner. In the case where the component is a spur gear wheel, the end face of the spur gear wheel may in particular have a concave region between the respective tooth tips and the respective tooth root. This concave region surrounds the longitudinal central axis of the spur gear wheel in an annular manner. In this case, it is possible that the concave region of the end face of the spur gear wheel has interruptions caused by the toothing of which the teeth extend at least into the concave region towards the tooth root.

The concave region is in this case formed by a reshaped formation. Preferably, the concave region is formed by a free reshaped formation that is not bound to the form of the tool, that is to say it is a free-form surface.

However, it is conceivable and possible also to assist this material flow by an additional convex shaping of the re-working punch. However, there should preferably always remain a free reshaped formation that is not bound to the tool and forms at least part of the concave form, that is to say at least part of the concave region is a free-form surface. In any case, the concave region is not formed by mechanical working, for example by turning, milling or grinding.

Seen in longitudinal central section, between the lateral surface and the end face or the functional contour and the end face and also in the region of the end face there are advantageously two portions of which the contours can be inscribed in radii, of which a first radius centre point is arranged with a first radius within the functional part and a second radius centre point is arranged with a second radius outside the functional part. In this respect, it should be preferred if the value of the first radius is less than one fifth, more preferably less than one tenth, of the value of the second radius. In addition, it should be preferred if the value of the second radius is less than four hundred fold, particularly preferably less than two hundred fold, in comparison with the value of the first radius.

In an advantageous form, the end face of the functional part has in this concave region a depression with respect to a circumferential periphery of the end face of the functional part. Seen in longitudinal central section through the functional part, the functional part consequently extends less far in the longitudinal direction directed towards the free end of the functional part in the region of this depression than in the region of the greatest radial extent of the end face, which is in particular flush with the greatest radial extent of the functional contour of the lateral surface of the functional part. At least in the region of the periphery of the end face of the functional part, which lies radially outside the deepest point of the said depression, the axial extent of the functional contour of the lateral surface preferably reaches up to the periphery of the end face of the functional part.

The way in which the functional part is formed according to the invention consequently allows an increase to be achieved in the axial extent of the region over which the lateral surface has an at least substantially dimensionally stable functional contour (="functional portion"). Furthermore, deviations from dimensional stability can expediently be reduced. Substantially means here that the dimensional deviations from the prescribed form of the functional contour with respect to the radial direction are below 0.1 mm, preferably below 0.05 mm and still more preferably below 0.01 mm. The diameter in which the lateral surface of the functional part is inscribed lies here with preference in the range from 5 mm to 20 mm.

Advantageously, the pushing of the calibrating tool onto the functional part allows a material flow of material of the functional part to be brought about by the tool. Therefore, a first step of calibrating the functional part is carried out during the pushing-on of the tool. This first calibrating step particularly allows the dimensional accuracy of the functional contour of the functional part to be improved, that is to say deviations of the cross section from the prescribed form can be reduced. This material flow has the effect of a certain reduction of the functional part in its diameter, at least in certain regions.

Calibration, as used in the sense of this document, means bringing to size by technical forming means.

Further advantages and details of the invention are explained below on the basis of the accompanying drawing, in which.

DETAILED DESCRIPTION

Figure 1:
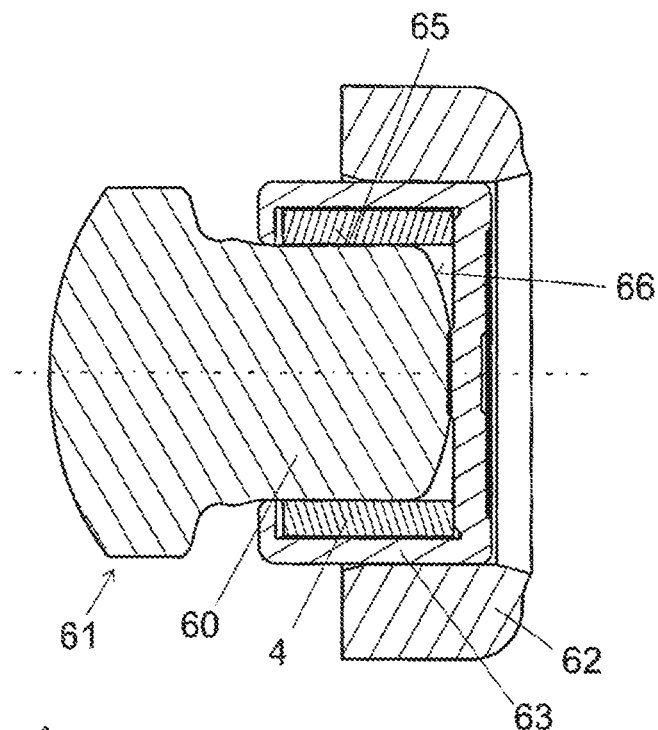
FIG. 1 shows a longitudinal central section through a bearing journal according to the prior art, which is mounted rotatably with respect to a joint yoke by way of a needle bearing.

FIG. 1 shows an exemplary embodiment of a functional part 60 formed in a conventional way, which is a bearing journal, the functional part being part of a component 61, which is a journal cross for a universal joint. The functional part 60 is mounted rotatably with respect to a joint yoke 62. For this purpose, inserted in the opening of the joint yoke is a bearing sleeve 63 and inserted between the bearing sleeve 63 and the functional part 60 are needles 64, which roll on the one hand on the lateral surface 65 of the functional part 60, on the other hand on the inner side of the bearing sleeve 63, whereby a needle bearing is formed. The lateral surface 65 is formed substantially cylindrically, at least in the portion of its axial extent in which the needles 64 roll on it.

At the free end of the functional part 60, the lateral surface 65 goes over into an end face 66, which bounds the functional part 60 in the axial direction. The end face 66, and also the transition from the lateral surface 65 to the end face, is curved convexly outwards (in the axial direction), whereby an end elevation of the functional part is formed. In the embodiment shown, in a central region of the end face there is a smaller depression, in which an axial projection of the bearing sleeve 63 engages, whereby the functional part 60 is supported in the axial direction.

The convexly curved region of the end face 66, and also of the transition from the lateral surface to the end face, is formed by a free-form surface that is formed during the extrusion of the component 61. In the region of the depression in the end face 66, arranged in the mould cavity of the extrusion tool is a bounding surface, against which the material of the journal cross runs during the extrusion. Depressions in the form of parts of spherical surfaces are also formed in this way on the end face in the case of a conventional functional part.

Figure 2:
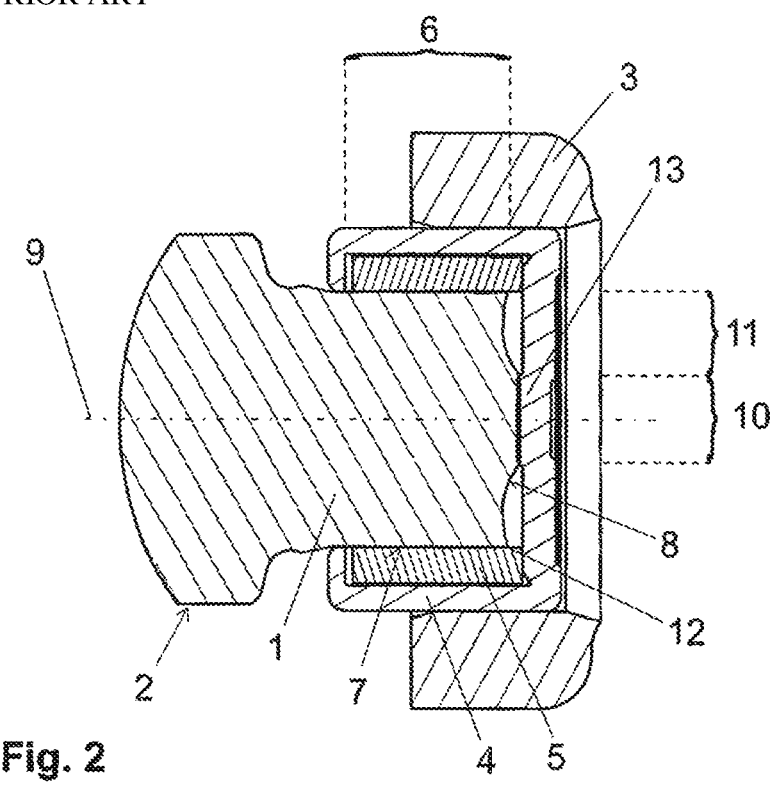
FIG. 2 shows a longitudinal central section through a bearing journal according to the invention, which is mounted rotatably with respect to a joint yoke by way of a needle bearing.
Figure 3:
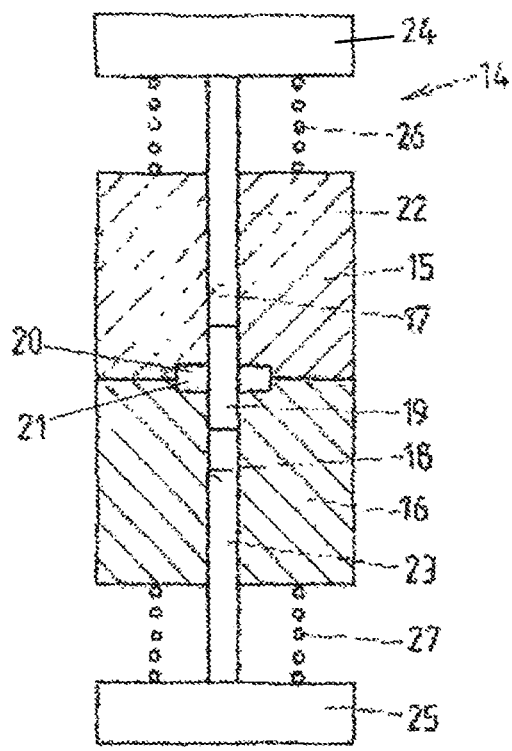
FIG. 3 shows a schematic representation of an extrusion tool for the cold extrusion of a journal cross with four bearing journals, partly in section, with an inserted blank.
Figure 4:
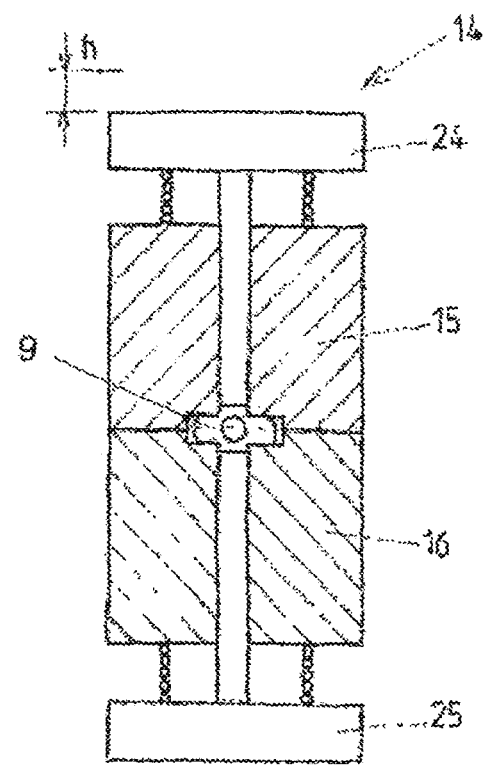
FIG. 4 shows a representation corresponding to FIG. 3, after the extruding operation.

A functional part formed in the way according to the invention, which is a bearing journal, is shown by FIG. 2. The functional part 1 may be part of a component 2, which is a journal cross 2 for a Cardan joint. However, the functional part may for example also be part of a tripod or some other component that can be rotatably mounted. In the exemplary embodiment shown, the functional part 1 is mounted rotatably with respect to a joint yoke 3. Arranged for this purpose in an opening of the joint yoke 3 is a bearing sleeve 4, rolling bodies 5 lying between the bearing sleeve 4 and the functional part 1. Here, these rolling bodies take the form of needles. In addition or instead, balls or else a sliding bearing could also be provided for example. The rolling bodies 5 roll on the one hand on the inner side of the bearing sleeve 4, on the other hand on a functional portion 6 of the lateral surface 7 of the functional part 1.

The lateral surface 7 surrounds the longitudinal central axis 9 of the functional part 1. The direction of the longitudinal extent of the functional part 1 lies parallel to this longitudinal central axis 9.

The region over which the lateral surface 7 is at least substantially cylindrical (=in the form of the lateral surface of a cylinder), in particular circular-cylindrical, is in this exemplary embodiment the functional portion 6 of the functional part 1. The cylinder axis here is the longitudinal central axis 9. As already stated in the introductory part of the description, "substantially cylindrical" means here cylindrical apart from production inaccuracies or tolerances. The cylindrical form of the lateral surface 7 in the region of the functional part 6 forms here the functional contour of the functional portion 6.

In the region of its free end, the functional part 1 has at the end an end face 8, which bounds the functional part 1 in the axial direction, that is to say in the direction of its longitudinal central axis 9. The delimitation between the lateral surface 7 and the end face 8 may for example be set where the normal to the surface of the functional part 1, taken from a central region of the functional part 1 remote from the free end in the direction of the free end of the functional part 1, goes below an angle of 45° in relation to the longitudinal central axis 9 for the first time.

A transitional region lying at the transition between the lateral surface 7 and the end face 8 may be set in an angular range between 10° and 45° in relation to the longitudinal central axis 9.

In a radially central region, the end face 8 has an elevation 10 that projects from a radially surrounding region in the axial direction. Seen in longitudinal central section (or in side view of the functional part 1), the functional part 1 consequently extends further in the axial direction, pointing from its base to its free end, in the region of the elevation 10 than in a region neighbouring the elevation 10. Preferably, the point of greatest axial extent of the functional part 1 in this axial direction lies in the region of the elevation 10. The elevation 10 is surrounded by a concave region 11 of the end face 8 completely, that is to say in an annular manner. In the concave region 11, the end face 8 is curved inwardly with respect to the axial direction. In the embodiment represented, the end face 8 has here in the concave region 11a depression with respect to a circumferential periphery 12 of the end face (the functional part therefore extends less far in the axial direction, pointing from the axially central region of the functional part 1 to its free end, in the region of this depression than in the region of the circumferential periphery). At this circumferential periphery 12, the end face 8 adjoins the functional portion 6 of the lateral surface 7 of the functional part 1 that takes the form of the lateral surface of a cylinder.

The elevation 10 may, in the way shown, have a more or less pronounced central depression. In this depression there can engage a projection 13 of the bearing sleeve 4 that supports the functional part 1 in the axial direction. However, a support of the functional part 1 in the axial direction may also take place in the region of the elevation 10 without it being formed with a depression. An additional, for example journal-like, elevation may even be provided.

The production of a functional part according to the invention is explained below for a first exemplary embodiment of the invention on the basis of FIGS. 3 to 10.

There first takes place the cold extrusion of the functional part 1 or a component 2, here a journal cross, that has at least one functional part 1 to be formed in the way according to the invention. In the exemplary embodiment, the journal cross 2 to be formed has four functional parts 1, the longitudinal central axes 9 of which lie in a common plane, the longitudinal central axes 9 of functional parts 1 that follow one another in the circumferential direction respectively being at right angles to one another.

The cold extrusion takes place in an extrusion tool 14, which has first and second dies 15, 16. The dies 15, 16 respectively have a bore 17, 18 at right angles to the parting plane between the dies 15, 16, these bores 17, 18 being in line with one another and forming a continuous channel. Placed in a central part of this channel is a cylindrical blank 19, which over one part of its extent extends into the bore 17 and over the other part of its extent extends into the bore 18.

In the region of their parting plane, the dies 15, 16 have clearances 20, 21, which together form cavities with cylindrical lateral surfaces. The longitudinal central axes of these cavities lie in a common plane and there are altogether four cavities, the longitudinal central axes of cavities that follow one another in the circumferential direction respectively being at right angles to one another (only two of these cavities can be seen in the sectional representation of the dies 15, 16 of FIG. 3). Inserted in the bores 17, 18 are cold-extrusion punches 22, 23, between which the blank 19 lies. The cold-extrusion punches 22, 23 are respectively attached to a carrier plate 24, 25, compression springs 26, 27 being arranged between the carrier plates 24, 25 and the dies 15, 16.

If the cold-extrusion punches 22, 23 have previously been placed against the blank 19 on both sides, the pressing together of the carrier plates 24, 25 by the travel h has the effect that the blank 19 is likewise upset by the amount h. Material of the blank 19 is thereby forced into the clearances 20, 21, the material flowing transversely in relation to the direction of movement of the cold-extrusion punches 22, 23. As a result, the functional parts 1 are formed. Here, the free ends of the functional parts 1 are spaced apart from the boundaries of the clearances 20, 21, so that free-form surfaces form in the region of the free ends of the functional parts 1. These surfaces form the end faces 8 of the functional parts 1 after the extruding operation.

To this extent, production corresponds to the prior art, for example as described in DE 2 819 167 A1, which was cited in the introductory part of the description.

Figure 5:
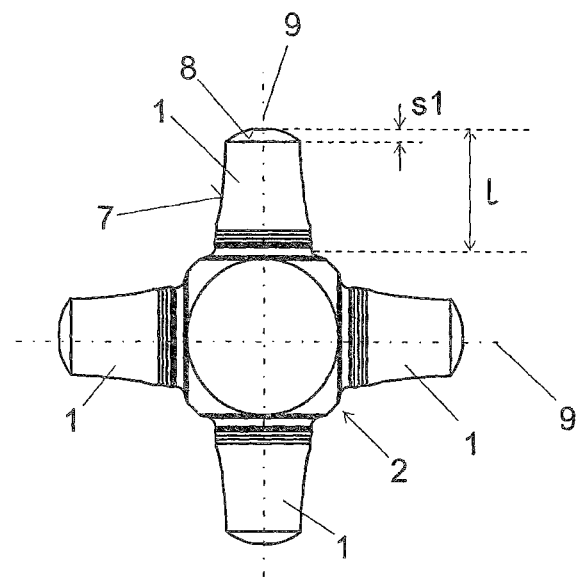
FIG. 5 shows a view of the journal cross removed from the extrusion tool.

The journal cross 2 removed from the extrusion tool is shown in FIG. 5. For the functional parts 1, their respective longitudinal central axis 9 is depicted. The lateral surface 7 of the cold-extruded functional part 1 surrounds the longitudinal central axis 9.

The lateral surfaces 7 of the cold-extruded functional parts 1 are shown in FIG. 5 with a form deviating from the form of a cylinder, to be precise in such a way that the functional parts 1 taper, substantially conically, towards their free ends. The deviation from the form of a cylinder is shown greatly exaggerated here for purposes of illustration. For example, the conicity may lie in the range of 0.2°.

The axial extent s1 of the elevation formed by the end face may lie in the range of 1-2 mm, while the total length 1 of the functional part may for example lie in the range from 5 mm to 15 mm.

After that, a re-working of the functional parts 1 is carried out, the re-working being explained in more detail below on the basis of one of the functional parts 1:

First, a sleeve-shaped calibrating tool 28 is pushed onto the functional part from the free end of the functional part in the axial direction thereof. At least one axial portion of the functional part 1 that adjoins the free end of the functional part 1, in the exemplary embodiment of the entire functional part 1, lies in the inner cavity of this sleeve-shaped calibrating tool. This inner cavity of the calibrating tool 28 is consequently surrounded by the inner wall surface 30 of the sleeve-shaped calibrating tool 28.

Figure 6:
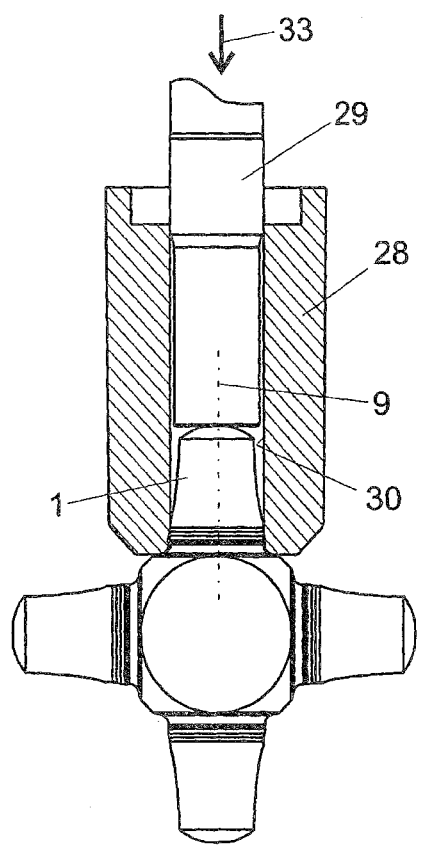
FIGS. 6 to 9 show schematic representations of working steps of the re-working of a bearing journal of the journal cross, partly in section.

After that, a re-working punch 29 already protruding into or inserted into the calibrating tool 28 is moved in the axial direction of the calibrating tool 28 or of the functional part 1 until it runs up against the free end of the functional part 1. This state is shown in FIG. 6 (the arrow 33 shows the direction of displacement). It could also be envisaged to push the calibrating tool 28 axially onto the functional part 1 together with the re-working punch 29 in the direction of the arrow 33 until the re-working punch 29 runs up against the free end of the functional part 1, whereby the end of the common axial displacement of the calibrating tool 28 and of the re-working punch 29 is reached.

In FIG. 6, a gap is shown between the portion of the lateral surface 7 that adjoins the end face 8 and the wall surface 30 of the calibrating tool 28 that surrounds the lateral surface 7. The calibrating tool 28 consequently would not have carried out any shaping of the functional part 1 during the pushing onto the functional part 1. With preference, however, it is also possible to choose the diameter of the calibrating tool 28 such that a material flow of material of the functional part 1 occurs during the pushing of the calibrating tool 28 onto the functional part 1 in a layer adjoining the lateral surface 7, that is to say a first step of calibrating the functional part 1 is already carried out during the pushing-on of the calibrating tool 28, for example in order to improve the roundness of the functional part 1.

Figure 7:
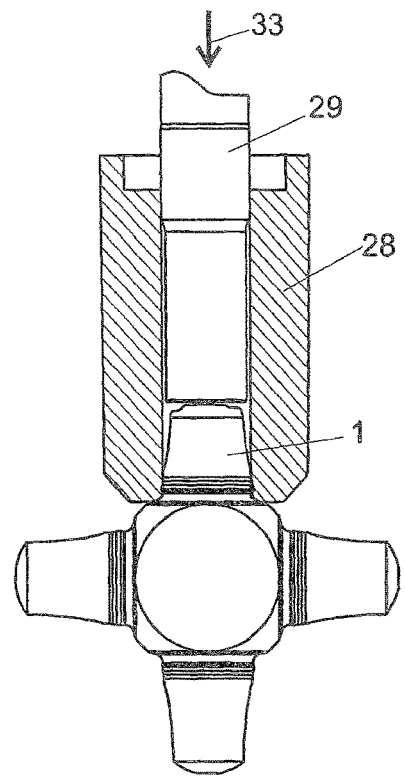
Figure 8:
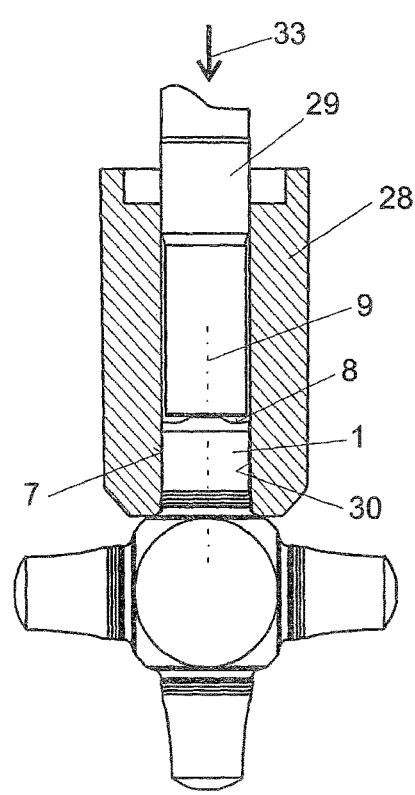

After that, the re-working punch 29 is pressed with such a high force against the free end of the functional part 1 (in the direction of the arrow 33) that a material flow of material of the functional part occurs. FIG. 7 shows an intermediate stage of this re-pressing operation and FIG. 8 shows the state at the end of this re-pressing operation. This re-pressing operation has the effect that the functional part 1 is upset, in particular in the region of the end of the journal. This upsetting causes a material flow of material of the functional part in the radial direction, in particular in the region of the curved end face 8. But also gap regions that are present between the lateral surface 7 and the wall surface 30 may possibly be closed as a result before the re-pressing operation. In the region of the outer circumference of the functional part 1, a material flow in the axial direction that is opposed to the direction in which the re-working punch 29 is pressed against the end of the journal also occurs in the end region of the functional part 1 in a layer adjoining the wall surface 30. This causes a lengthening of the at least essentially cylindrical part of the lateral surface 7. The functional portion 6 of the lateral surface 7 over which the latter serves for the mounting of rolling bodies 5 can in this way be lengthened.

In the example, the material flow in the axial direction takes place in a free reshaped formation. However, it is conceivable and possible also to assist this material flow by an additional convex shaping of the re-working punch (not represented). However, a free reshaped formation that is not bound to the tool should preferably also always remain enabled.

Figure 9:
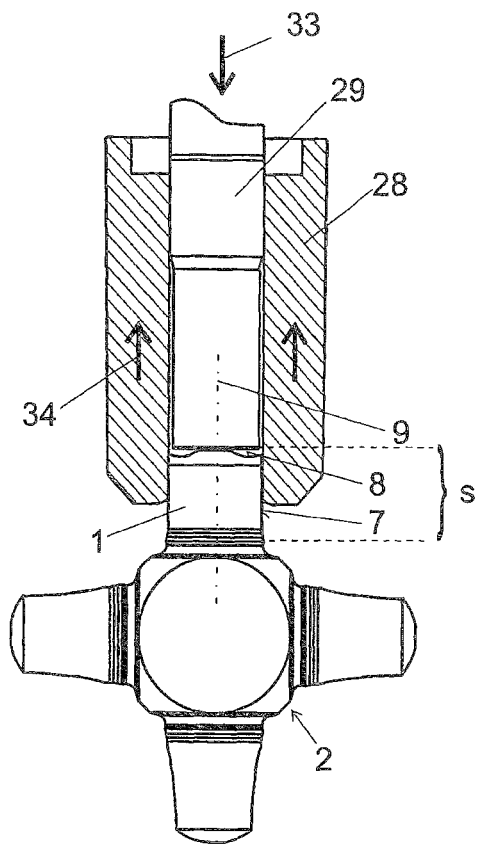

After the re-pressing operation by the re-working punch 29, the calibrating tool 28 is pulled off from the functional part 1, cf. FIG. 9. The pulling-off of the calibrating tool 28 in the direction 34 may take place here against a great force opposed to the direction of the pulling-off. During the pulling-off of the sleeve-shaped calibrating tool 28 after the re-pressing operation with the re-working punch 29, a material flow of material of the functional part 1 is brought about in a layer adjoining the lateral surface 7. During the pulling-off of the calibrating tool 28 from the functional part 1, the re-working punch 29 initially still remains pressed against the free end of the functional part 1. The pressing force here may be lower than during the upsetting of the free end of the functional part 1 with the re-working punch 29. The pressing action is expediently ended shortly before the calibrating tool 28 has been pulled off completely from the functional part 1. The re-working punch 29 therefore remains pressed against the end face 8 of the functional part 1 at least over a partial travel of the pulling-off travel s of the calibrating tool 28.

The pulling-off travel s ends as soon as the functional part lies completely outside the cavity of the calibrating tool 28, that is to say there is no longer any axial overlap. The partial travel is preferably at least 70%, particularly preferably at least 90%, of the total pulling-off travel s, following on from the beginning thereof. The partial travel over which a pressing force is maintained may be controlled by sensing the position of the calibrating tool 28 or by a time measurement (with a given speed of the calibrating tool 28). The calibrating result can be improved further by specific control of the pressing force in dependence on the movement travel of the calibrating tool 28 during the pulling-off (the movement travel being sensed by sensing the position of the calibrating tool 28 or by measuring the time since the beginning of the pulling-off) and/or the moving force that is required for pulling off the calibrating tool 28.

Figure 10:
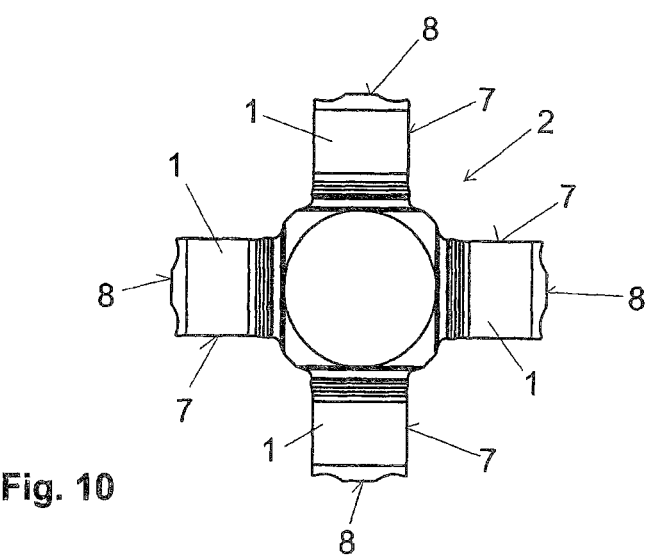
FIG. 10 shows a view of the journal cross with the re-worked bearing journal.

The component 2 with the functional parts 1 that have all been re-worked in the way described is shown in FIG. 10.

If desired, a depression may be made in a central region of the elevation 10 during the re-working, for example by a corresponding elevation in a central region of the re-working punch 29.

After the re-working described, the shaping working steps on a functional part 1 formed in the way according to the invention are advantageously concluded. In particular, no subsequent grinding operations are required. A functional part according to the invention can be subsequently hardened in the conventional way.

It would also be conceivable and possible to carry out one or more further calibrating steps before the hardening.

The re-working described may also be carried out simultaneously for two or more functional parts. In particular, opposing functional parts of which the longitudinal central axes 9 lie on a line may be calibrated simultaneously, whereby the supporting of the pressing forces is particularly advantageous.

Figures 11, 12:
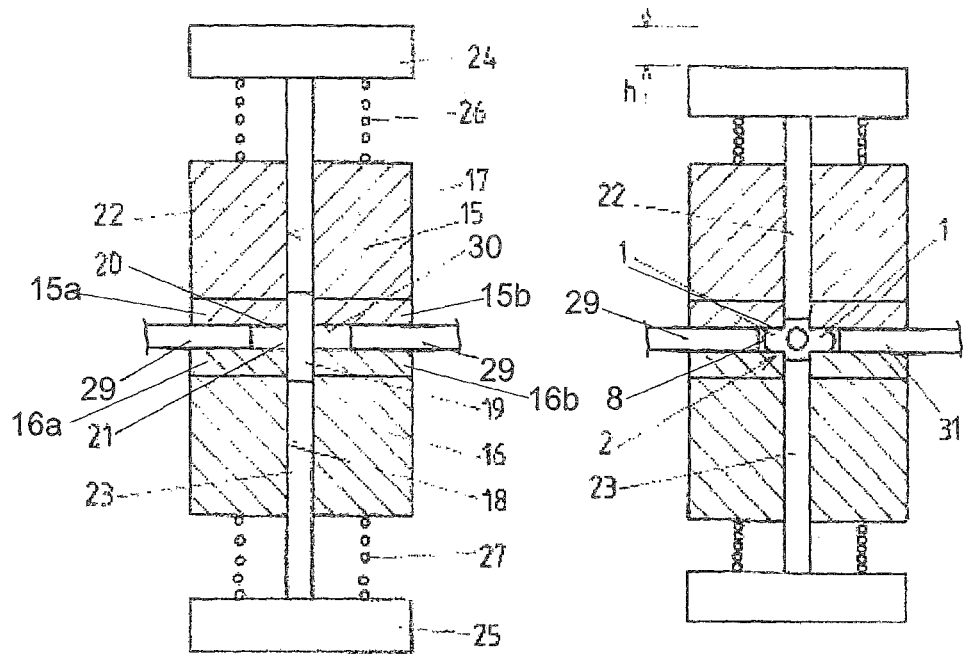
FIGS. 11 to 13 show schematic representations of working steps for producing a component with two opposing bearing journals according to a second embodiment of the invention, which represents the extrusion tool partly in section.
Figure 13:
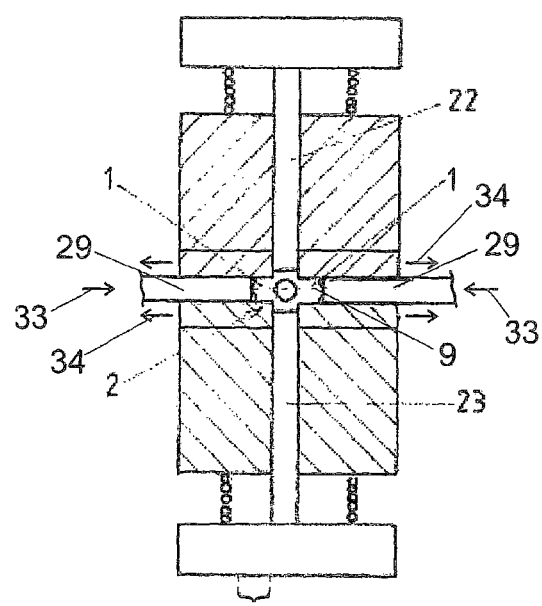

A second exemplary embodiment of the way in which a functional part is produced according to the invention is described below on the basis of FIGS. 11 to 13.

Once again, there first takes place the cold extrusion of the functional part 1 or of the component 2 that has the at least one functional part 1. The extrusion tool represented in FIG. 11 corresponds here to the extrusion tool previously described on the basis of FIG. 3, with the difference that only two opposing clearances 20, 21 are provided, these clearances being continued up to the respective end face of the respective die 15, 16, so that an altogether cylindrical channel is obtained. A re-working punch 29 is respectively inserted in the opposing cylindrical channels, a free space remaining between the extreme end of the re-working punch 29 and the central channel that receives the blank 19. During the infeeding of the cold-extrusion punches 22, 23, the material of the blank 19 is forced into this cavity in order to form the respective functional part 1. Between the end face of the respective functional part 1 and the re-working punch 29 there remains a spacing over the entire extent of the end face 8, as shown in FIG. 12, or at least over part of the extent of the end face 8, the end face 8 being formed as a free-form surface in this spaced-apart region.

After the extrusion, here the component 2 remains in the extrusion tool. The functional parts 1 are consequently arranged in a cavity that is circumferentially bounded altogether by a wall surface 30, this wall surface 30 being formed partly by the first die 15 and partly by the second die 16.

After that, the re-working punch 29 assigned to a respective functional part 1 is pressed against the free end of the functional part 1 in such a way that a plastic deformation of the functional part is carried out, in particular in its end region. The plastic deformation is the same here as described in the first exemplary embodiment.

The dies 15, 16 have die parts 15a, 15b, 16a, 16b, which respectively adjoin the parting plane and have the clearances 20, 21. The die parts 15a, 16a on the one hand and the die parts 15b, 16b on the other hand may be respectively pulled out here in a direction 34 that lies parallel to the direction 33 in which the respective re-working punch 29 is pressed against the free end of the functional part 1 and is opposed thereto. The die parts 15a, 16a and 15b, 16b are pulled off from the functional part 1 in this direction 34, while the respective re-working punch 29 remains pressed against the end face 8 of the respective functional part 1, at least over a partial travel of the pulling-off travel s. During this pulling-off of the die parts 15a, 16a and 15b, 16b, a material flow of material of the respective functional part 1 occurs.

This once again expediently concludes the shaping working steps on the respective functional part and a hardening of the functional parts formed can be subsequently carried out. However, it would also be conceivable and possible that, after the removal of the component 2 having the at least one functional part 1 from the extrusion tool and before the hardening, at least one step of calibrating the functional part or a respective functional part is also carried out. For example, a sleeve could be pushed onto the functional part 1, this sleeve bringing about a material flow of material of the functional part during the pushing onto the functional part. As a result, the roundness of the functional part could be further improved for example.

Other components that have at least one bearing journal 1, for example tripods, may also be formed by analogy with the exemplary embodiments described.

There follows a description of embodiments of the invention in which the functional parts are spur gear wheels. In the exemplary embodiments, the components are formed as a whole by the functional part described. Components that have more than one functional part could also be formed, for example components with two spur gear wheels with a respective toothing that lie coaxially in relation to one another and respectively comprise an axial portion of the component.

Parts that are equivalent to the exemplary embodiments described above are once again denoted by the same designations.

Figure 14:
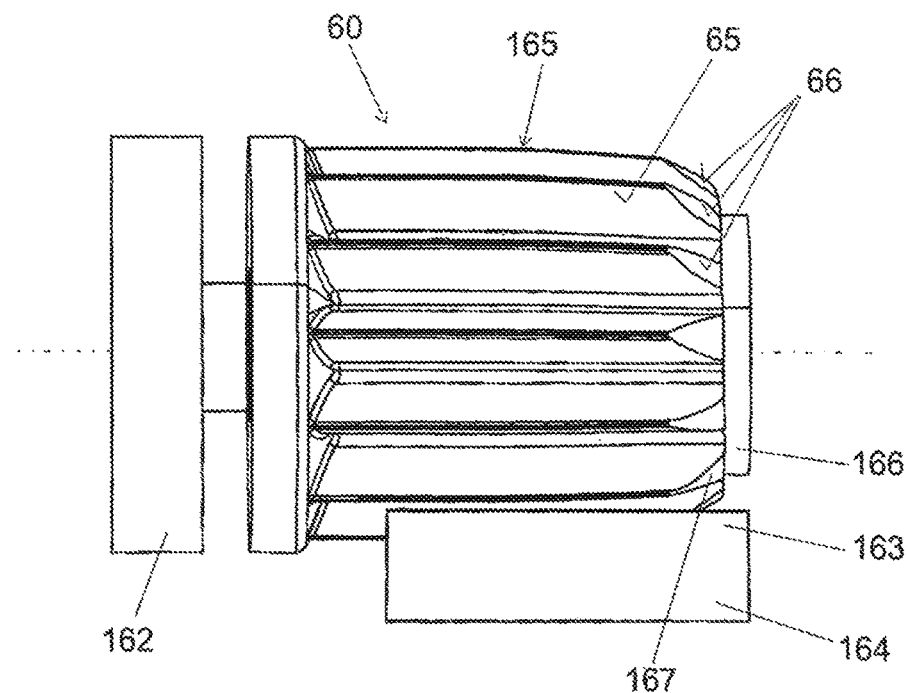
FIG. 14 shows a longitudinal central section through a spur gear wheel according to the prior art.

In preparation for the description of these embodiments, FIG. 14 shows an exemplary embodiment of a functional part 60 formed in a conventional way in the form of a spur gear wheel with a toothing 165, which forms the functional contour of the functional part 60. The functional part 60 is mounted rotatably with respect to a bearing part 162. The toothing 165 engages in a counter-toothing 163 of a further gear wheel 164, which is only represented schematically.

At an end of the functional part 60 that is free with respect to the axial direction, an end face 66 bounds the functional part 60 in the axial direction. The end face 66 comprises a bearing elevation 166, a flattened portion surrounding the latter and a free-form surface 167, which adjoins thereto radially outwards, is curved convexly outwards (and may subsequently be removed on a lathe) and continues into a transitional region between the end face 66 and the lateral surface or functional contour. The bearing elevation 166 is provided for setting axial distances from other components, but may also be omitted. In the region of the bearing elevation 166 in the end face 66, a bounding surface against which the material of the journal cross is directed during the extrusion is arranged in the extrusion tool. Other forms, such as for example depressions, may also be formed in this way on the end face in the case of conventional spur gear wheels.

Figure 15:
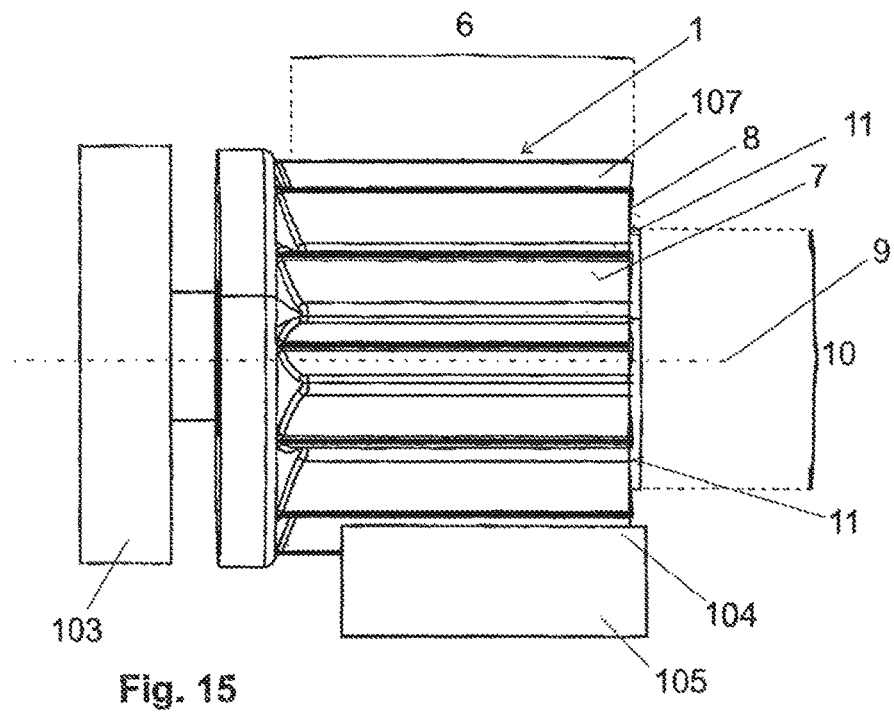
FIG. 15 shows a longitudinal central section through a spur gear wheel according to a third embodiment of the invention.
Figure 16:
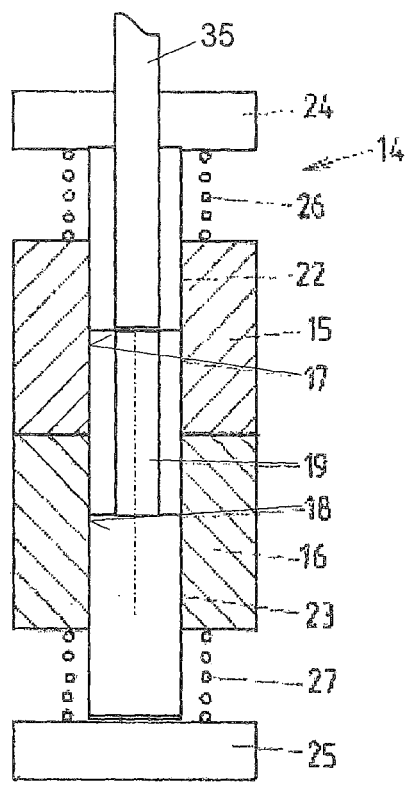
FIG. 16 shows a schematic representation of an extrusion tool for the cold extrusion of a spur gear wheel, partly in section, with an inserted blank.
Figure 17:
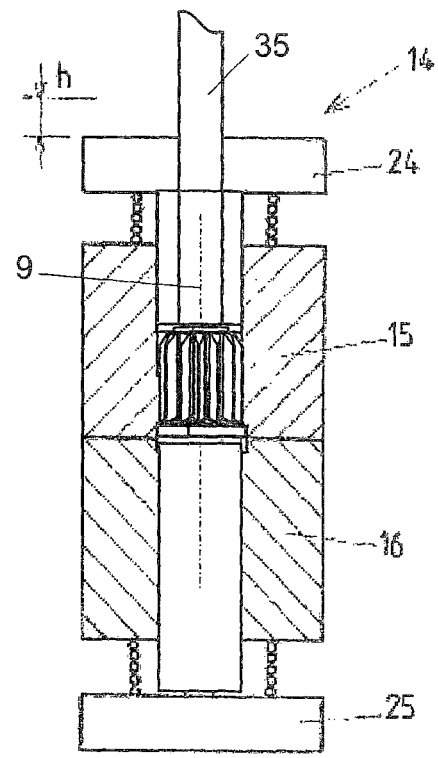
FIG. 17 shows a representation corresponding to FIG. 16, after the extruding operation.

A functional part 1, which takes the form of a spur gear wheel, according to a third embodiment of the invention is represented in FIG. 15. The functional part 1 may be part of a gear mechanism. In the exemplary embodiment shown, the functional part 1 is mounted rotatably about its longitudinal central axis 7 by a bearing part 103. The toothing 107 of the functional part 1 engages in a counter-toothing 104 of a further gear wheel 105, which is only represented schematically.

The toothing 107 is formed by a portion of the axial extent of the lateral surface 7 of the functional part 1 that surrounds the longitudinal central axis 9. The direction of the longitudinal extent of the functional part 1 lies parallel to the longitudinal central axis 7.

Figure 29:
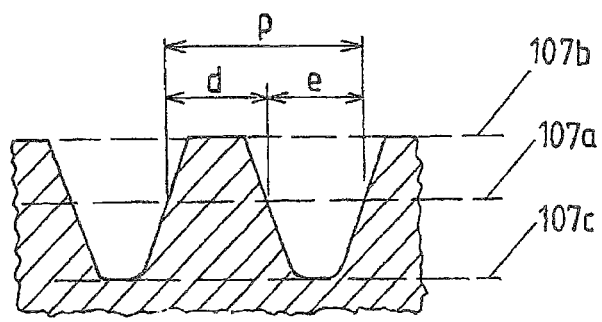
FIG. 29 shows a schematic representation to explain the profile reference line.

The profile reference line 107a of the toothing 107 is explained on the basis of FIG. 29. In FIG. 29, part of the toothing 107 is shown in the cross section lying at right angles to the longitudinal central axis 9 of the functional part at one point of the longitudinal extent of the toothing 107, the toothing 107 being shown as rolled out (spread out) into a plane. The profile reference line 107a is the line on which the tooth thickness d is equal to the gap width e. The gap width e is equal to half the pitch p. The toothing rolled out into a plane is also referred to as the reference profile, which is enclosed by the tip line 107b, which is parallel to the profile reference line, and the root line 107c, which is parallel to the tip line.

If the toothing represented in FIG. 29 is again rolled up around the longitudinal central axis 9, the profile reference line 107a runs circularly around the longitudinal central axis 9. The profile reference line 107a is therefore the line running circularly around the longitudinal central axis 9 on which the tooth thickness is equal to the gap width. At every point of the axial extent of the toothing, the profile reference line 107a is at a specific distance from the longitudinal central axis 9. The region over which the distance of the profile reference line 107a from the longitudinal central axis is substantially constant is the functional portion 6 of the toothing 107. Over this functional portion, the toothing 107 forms the functional contour of the functional part formed as a spur gear wheel.

Instead of the substantially constant distance of the profile reference line from the longitudinal central axis 9, a substantially constant distance of the tooth tips from the longitudinal central axis 9 could also be used.

As already stated in the introductory part of the description, "substantially constant" means here constant apart from production inaccuracies or tolerances.

In the figures, a straight-toothed spur gear wheel is represented. The same applies analogously to a helically toothed spur gear wheel.

In the region of its free end, the functional part 1 has at the end an end face 8, which bounds the lateral surface 7 in the axial direction, that is to say in the direction of its longitudinal central axis 9. The delimitation between the lateral surface 7 and the end face 8 may for example be set where the normal to the surface on the lateral surface 7 of the functional part 1, taken from a central region of the functional part 1 remote from the free end in the direction of the free end of the functional part 1, goes below an angle of 45° in relation to the longitudinal central axis 9 for the first time, as seen in longitudinal section. A transitional region lying at the transition between the lateral surface 7 and the end face 8 may be set in an angular range between 10° and 45° in relation to the longitudinal central axis 9.

In a radially central region, the end face 8 has an elevation 10 that projects from a radially surrounding region in the axial direction. Seen in longitudinal central section (or in side view of the functional part 1), the functional part 1 consequently extends further in the axial direction, pointing from its base to its free end, in the region of the elevation 10 than in a region neighbouring the elevation. Preferably, the point of greatest axial extent of the functional part 1 in this axial direction lies in the region of the elevation 10. The elevation 10 is surrounded by a concave region 11 of the end face 8 completely, that is to say in an annular manner. In the concave region 11, the end face 8 is curved inwardly with respect to the axial direction. In the embodiment represented, the end face 8 has here in the concave region 11$a$ depression with respect to a circumferential periphery 12 of the end face. In the exemplary embodiment, the functional portion extends up to the circumferential periphery. The circumferential periphery is formed by the circle at the end of the functional portion that circumscribes the toothing 107. The functional part 1 therefore extends less far in the axial direction, pointing from the axially central region of the functional part 1 to its free end, in the region of this depression than in the region of the circumferential periphery 12.

The elevation 10 may, in the way shown, have an approximately planar surface with an opening for receiving a bearing spindle or some other form.

The production of a functional part according to the invention in the form of a spur gear wheel is explained below for a third exemplary embodiment of the invention on the basis of FIGS. 16 to 25.

The cold extrusion of the functional part 1 takes place in an extrusion tool 14, which has first and second dies 15, 16. The dies 15, 16 respectively have a bore 17, 18 at right angles to the parting plane between the dies 15, 16, these bores 17, 18 being in line with one another and forming a continuous channel. Placed in a central part of this channel is a cylindrical blank 19, which over one part of its extent extends into the bore 17 and over the other part of its extent extends into the bore 18.

In the region of their parting plane, the dies 15, 16 have radial clearances that together form a cavity with lateral surfaces approximately inversely the same as the finished component. These clearances are not shown in the figures for the sake of simplicity. Inserted in the bores 17, 18 are cold-extrusion punches 22, 23, between which the blank 19 lies. The cold-extrusion punches 22, 23 are respectively attached to a carrier plate 24, 25, compression springs 26, 27 being arranged between the carrier plates 24, 25 and the dies 15, 16.

If the cold-extrusion punches 22, 23 have previously been placed against the blank 19 on both sides, the pressing together of the carrier plates 24, 25 by the travel h has the effect that the blank 19 is likewise upset by the amount h. Material of the blank 19 is thereby forced into the clearances the material flowing transversely in relation to the direction of movement of the cold-extrusion punches 22, 23. As a result, the toothing is formed. The free end of the functional part 1 that is the upper end in the representation has here a free space between the cold-extrusion punch 22 and the toothing, so that free-form surfaces form in the region of the free end of the functional part 1. These form parts of the end face 8 of the spur gear wheel after the extruding operation.

In the present description, the operation of extruding the spur gear wheel was presented in a simplified way. The representation of a hole punch 35 for forming the clearance for receiving the spindle of the rotatable mounting of the spur gear wheel has been presented in a simplified form for reasons of providing a clear overview, while dispensing with a representation of the sequence of movements. Comparable production methods are to this extent described in the prior art, for example as in EP 0 560 010 B1, which was cited in the introductory part of the description, or else JP 10-211539A.

Figure 18:
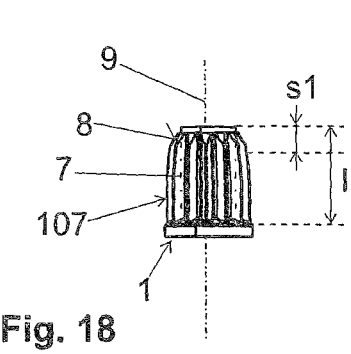
FIG. 18 shows a view of the spur gear wheel removed from the extrusion tool.

The functional part 1 removed from the extrusion tool is shown in FIG. 18. For the functional part 1, the longitudinal central axis 9 is depicted. The toothing 107 of the extruded functional part 1 surrounds the longitudinal central axis 9.

The toothing 107 of the cold-extruded functional part 1 is shown in FIG. 18 with a form deviating from the straight form, in which the profile reference line 107 is at a constant distance from the longitudinal central axis 9 over the region of the axial extent of the toothing 107, to be precise in such a way that the profile reference line 107 comes closer to the longitudinal central axis 9 towards the free end of the functional part 1. Consequently, the tooth crests of the toothing 107 come closer to the longitudinal central axis 9. The deviation from parallelism is shown greatly exaggerated here for purposes of illustration. The deviation may for example lie in the range of 0.2°.

The axial extent s1 of the elevation formed by the end face may lie in the range of 1 mm-4 mm, while the total length 1 of the functional part 1 may for example lie in the range from 5 mm to 50 mm.

After that, a re-working of the functional part 1 is carried out.

First, a sleeve-shaped calibrating tool 28 is pushed onto the functional part 1 from the free end of the functional part 1 in the axial direction thereof. At least one axial portion of the toothing 107 that adjoins the free end of the functional part 1, in the exemplary embodiment of the entire portion of the toothing 107, lies in the inner cavity of this calibrating tool 28. This inner cavity of the calibrating tool 28 is consequently surrounded by the inner wall surface 30 of the calibrating tool.

Figure 19:
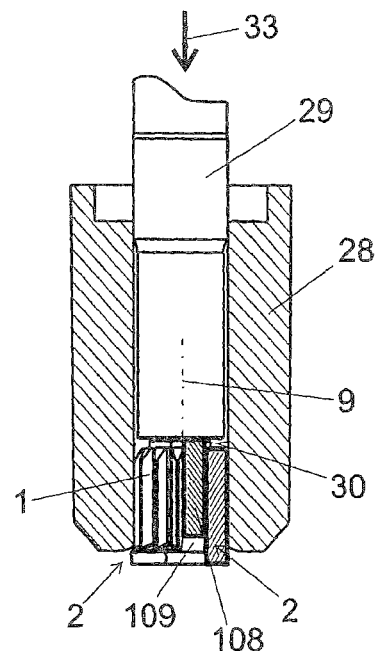
FIGS. 19 to 22 show schematic representations of working steps of the re-working of a spur gear wheel, partly in section.

After that, a re-working punch 29 already protruding into or inserted into the calibrating tool 28 is moved in the axial direction of the calibrating tool 28 or of the functional part 1 until it runs up against the free end of the functional part 1. This state is shown in FIG. 19 (the arrow 33 shows the direction of displacement). It could also be envisaged to push the calibrating tool 28 axially onto the toothing 107 together with the re-working punch 29 in the direction of the arrow 33 until the re-working punch 29 runs up against the free end of the toothing 107, whereby the end of the common axial displacement of the calibrating tool 28 and of the re-working punch 29 is reached.

In FIG. 19, a gap is shown between the portion of the lateral surface 7 of the toothing 107 that adjoins the end face 8 and the wall surface 30 of the calibrating tool 28 that surrounds the lateral surface 7. The calibrating tool 28 consequently would not have carried out any shaping of the toothing 107 during the pushing onto the toothing 107. With preference, however, it is also possible to choose the diameter of the calibrating tool 28 such that a material flow of material of the functional part 1 occurs during the pushing of the calibrating tool 28 onto the toothing 107 in a layer adjoining the lateral surface 7 of the toothing, that is to say a first step of calibrating the toothing 107, and consequently the functional part 1, is already carried out during the pushing-on of the calibrating tool 28, for example in order to reduce the dimensional deviations of the toothing 107.

Figure 20:
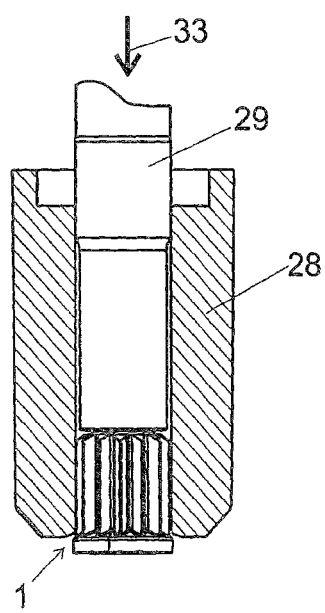
Figure 21:
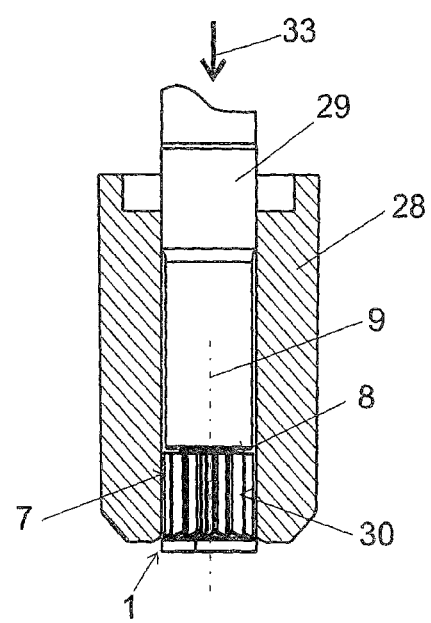

After that, the re-working punch 29 is pressed with such a high force against the free end of the functional part 1 (in the direction of the arrow 33) that a material flow of material of the functional part 1 occurs. FIG. 20 shows an intermediate stage of this re-pressing operation and FIG. 21 shows the state at the end of this re-pressing operation. This re-pressing operation has the effect that the functional part 1 is upset, in particular in the region of the free end. This upsetting causes a material flow of material of the functional part 1 in the radial direction, in particular in the region of the curved end face 8. But also gap regions that are present between the lateral surface 7 of the toothing 107 and the wall surface 30 may possibly be closed as a result before the re-pressing operation. In the region of the outer circumference of the functional part 1, a material flow in the axial direction that is opposed to the direction in which the re-working punch 29 is pressed against the end of the journal also occurs in the end portion of the toothing 107 in a layer adjoining the wall surface 30. This causes a lengthening of the functional portion 6.

Figure 22:
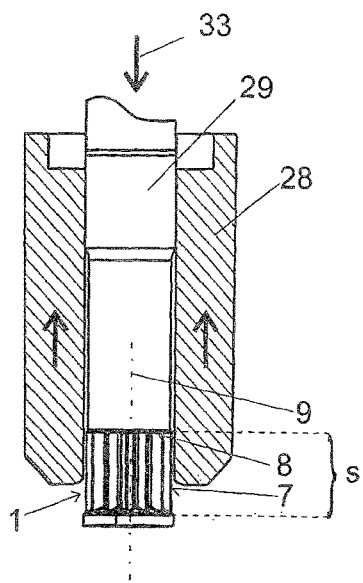

After the re-pressing operation by the re-working punch 29, the calibrating tool 28 is pulled off from the bearing journal 1, cf. FIG. 22. The pulling-off of the sleeve 28 may take place here against a great force opposed to the pulling-off. During the pulling-off of the calibrating tool 28 after the re-pressing operation with the re-working punch 29, a material flow of material of the functional part 1 is brought about in a layer adjoining the lateral surface 7 of the toothing 107. During the pulling-off of the calibrating tool 28 from the functional part 1, the re-working punch 29 initially still remains pressed against the free end of the functional part 1. The pressing force here may be lower than during the upsetting of the functional part 1 with the re-working punch 29. The pressing action is expediently ended shortly before the calibrating tool 28 has been pulled off completely from the functional part 1. The pressing action exerted by the re-working punch 29 consequently takes place over a partial travel of the pulling-off travel s of the calibrating tool 28. The calibrating result can be improved further by specific control of the pressing force in dependence on the movement travel of the calibrating tool 28 during the pulling-off (by sensing the position of the calibrating tool 28 or by measuring the time with a known speed of the calibrating tool 28) and/or the moving force that is required for pulling off the calibrating tool 28.

Figure 23:
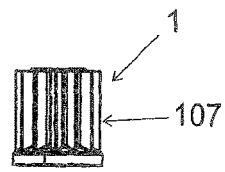
FIG. 23 shows a view of the spur gear wheel after the re-working.
Figure 25:
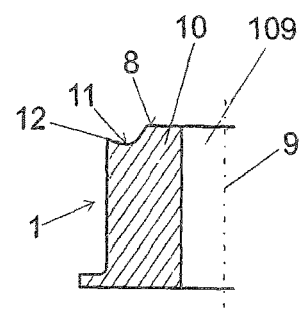
FIG. 25 shows a representation of a detail of the spur gear wheel corresponding to FIG. 23 in section.
Figure 24:
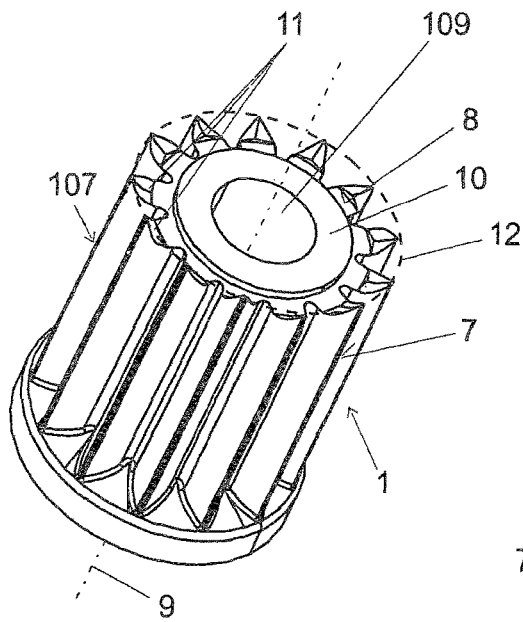
FIG. 24 shows an isometric view of the spur gear wheel corresponding to FIG. 23.

The functional part 1 with the toothing 107 that has been re-worked in the way described is shown in FIGS. 23, 24 and 25. The tooth tips are at a constant distance from the longitudinal central axis 9 over the functional portion. The end face 8 with the concave region 11 can be seen particularly well in the partial section corresponding to FIG. 25. It can also be seen there that the toothing 107 on the end face 8 is likewise formed concavely between the two tooth flanks of the individual teeth.

If desired, a different surface structure may be introduced in a central region of the elevation 10 during the re-working, for example by a corresponding geometry in a central region of the re-working punch 29. The re-working punch advantageously has a central pin 108, which is moved into the central opening 109 of the functional part 1 in order to limit flowing of the material into the region of the opening. This is illustrated in FIG. 19 in the half-section through the pin 108 and the functional part 1 on the side to the right of the longitudinal central axis 9.

After the re-working described, the shaping working steps on a functional part 1 formed in the way according to the invention with the toothing 107 are advantageously concluded. In particular, no subsequent grinding operations or other machining operations are required.

A spur gear wheel or other component according to the invention can be subsequently hardened in the conventional way.

Figure 26:
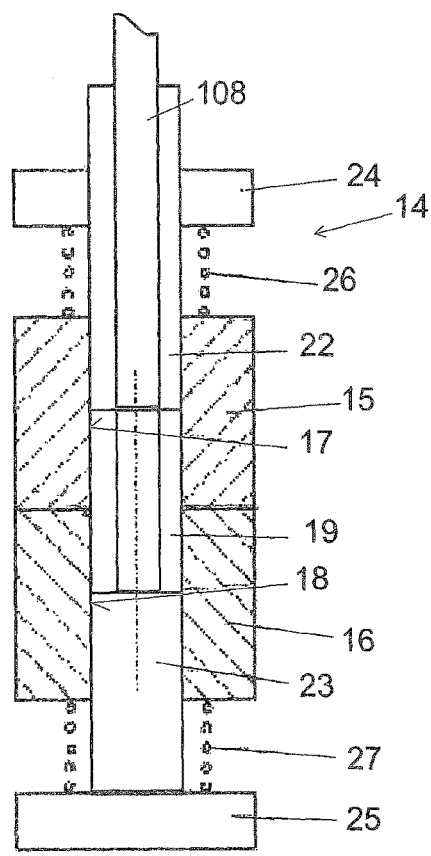
FIGS. 26 to 28 show schematic representations of working steps for the production of a spur gear wheel according to a fourth embodiment of the invention, which represents the extrusion tool partly in section.
Figure 27:
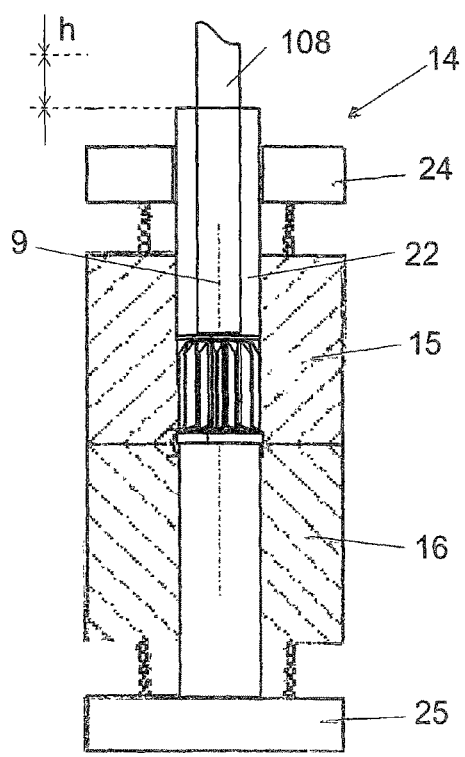

A fourth exemplary embodiment of the way in which a functional part 1 is produced according to the invention in the form of a spur gear wheel is described below on the basis of FIGS. 26 to 28.

Once again, there first takes place the cold extrusion of the functional part 1. The extrusion tool represented in FIG. 26 corresponds here to the extrusion tool previously described on the basis of FIG. 16, with the difference that the cold-extrusion punch 22 can be moved independently of the first die 15. To form the functional part 1 with the toothing 107, the material of the blank 19 is forced into the cavity that is bounded by the dies 15, 16 during the infeeding of the cold-extrusion punches 22, 23. Between the end face of the functional part 1 and the re-working punch 22 there remains a spacing here (as shown in FIG. 26), the end face 8 being formed as a free-form surface in this spaced-apart region.

After the extrusion, here the functional part 1 remains in the extrusion tool. At least over a free end having the end face 8, the functional part 1 is arranged in a cavity of the first die 15 that is circumferentially bounded by a wall surface 30 that lies against the lateral surface 7 forming the toothing 107.

After that, the separately activatable cold-extrusion punch 22 is pressed by a further increment h1 against the free end of the functional part 1, a further plastic deformation of the functional part 1 being carried out, in particular in a region of the free end having the end face 8. The hole punch 35 thereby remains in the central opening 109 of the component.

Figure 28:
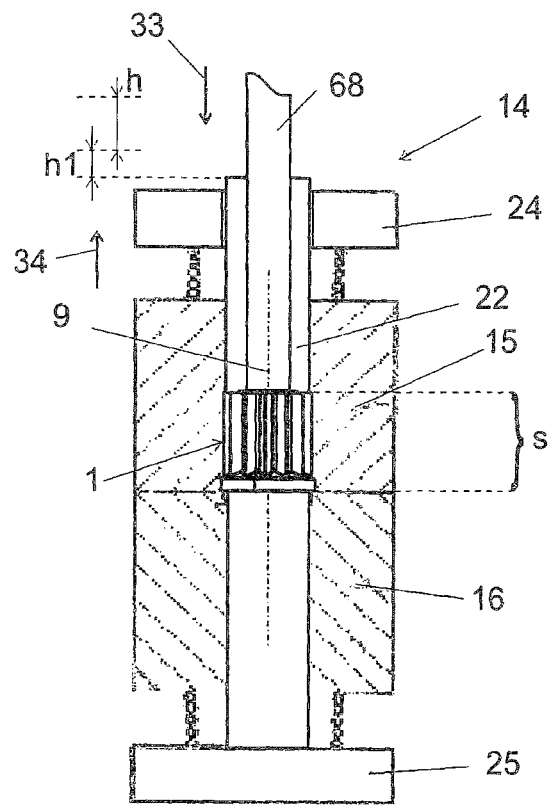

After that, the first die 15 is pulled off from the functional part 1 over the pulling-off travel s (depicted in FIG. 28 is the direction 34). The cold-extrusion punch 22 remains pressed against the end face 8 of the functional part 1, at least over a partial travel of the pulling-off travel s. During the pulling-off of the die 15 from the functional part 1, a material flow of the material of the functional part 1 is brought about in a way analogous to that already described.

In this way, the shaping working steps on the toothing 107 of the functional part 1 are once again expediently concluded, and after that a hardening of the functional part 1 can be carried out. However, it would also be conceivable and possible that at least one further step of calibrating the component is also carried out after the removal of the component from the extrusion tool and before the hardening.

For example, a sleeve could be pushed onto the functional contour, in the example the toothing, of the component, this sleeve bringing about a material flow of material of the spur gear wheel during the pushing onto the toothing. As a result, for example, the dimensional deviation of the toothing could be further reduced.

Figure 30:
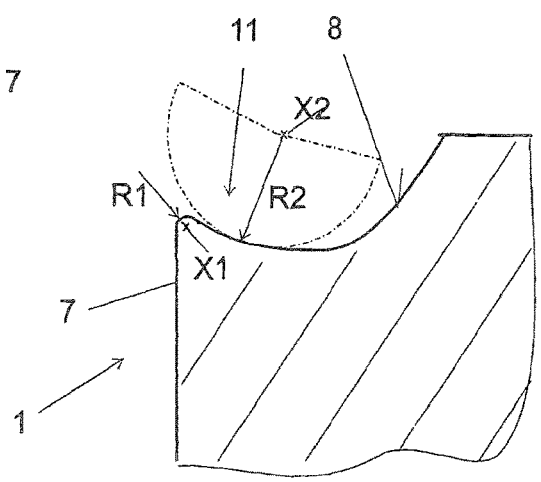
FIG. 30 shows a schematic representation to explain the concave region.

In FIG. 30, a schematic representation of a concave profile in the functional part 1 is illustrated. The transitional region between the lateral surface 7 and the end face 8 is evident from the figure. Seen in longitudinal central section, in the transitional region between the lateral surface 7 of the end face 8 and also in the region adjoining thereto of the end face 8 there are formed two portions of which the contour can be inscribed in radii. The first portion can be described with a first radius R1, the first radius centre point X1 of which is arranged within the component. The second portion, the concave region 11, can be described with a second radius R2, the radius centre point X2 of which is arranged outside the component. In this respect, it should be preferred if the value of the first radius R1 is less than one fifth, more preferably less than one tenth, of the value of the second radius R2. In addition, it should be preferred if the value of the second radius R2 is less than four hundred fold, preferably less than two hundred fold, in comparison with the value of the first radius R1.

Instead of spur gear wheels, other components which have at least one functional surface that is point-symmetrical when seen in cross section, for example parts with two or more opposing planar surfaces, may also be formed in a way analogous to the exemplary embodiments described.

The invention claimed is:

1. A method for working a functional part that extends in a longitudinal direction, has a lateral surface surrounding a longitudinal central axis of the functional part that extends in the longitudinal direction, and has an end face extending in an axial direction that bounds the functional part at a free end thereof, the method comprising:
   cold-extruding the functional part in an extrusion tool having at least one cold-extrusion punch and a plurality of dies associated therewith;
   removing the functional part from the extrusion tool after the cold-extrusion;
   loading at least a portion of the free end of the functional part into a cavity of a forming tool by pushing the forming tool onto the functional part in the longitudinal direction of the functional part, wherein the cavity of the forming tool is bounded, in a radial direction with respect to the longitudinal central axis of the functional part, by a wall surface of the cavity, which wall surface surrounds and at least partially abuts against the lateral surface of the functional part;
   pressing a re-working punch that protrudes into the cavity of the forming tool and is moveable in a longitudinal direction with respect to the functional part against the end face of the functional part;
   pulling the forming tool off of the functional part in the longitudinal direction over the free end of the functional part, while during at least a portion of said pulling the re-working punch remains pressed against the end face of the functional part; and
   forcing a flow of the material of the functional part by the forming tool, during said pulling step.

2. The method of claim 1, wherein the forming tool is formed as a sleeve.

3. The method of claim 1, wherein pressing the re-working punch against the end face of the functional part plastically deforms the functional part and causes a material flow of material of the functional part.

4. The method of claim 1, wherein the re-working punch is displaceable by the forming tool, at least after said loading step.

5. The method of claim 1, wherein the functional part is one of a spur gear wheel, a bearing journal, or a journal cross.

6. A method for working a functional part that extends in a longitudinal direction, has a lateral surface surrounding a longitudinal central axis of the functional part that extends in the longitudinal direction, and has an end face extending in an axial direction that bounds the functional part at a free end thereof, the method comprising:
   loading at least a portion of the free end of the functional part into a cavity of an extrusion tool that is bounded in a radial direction with respect to the longitudinal central axis of the functional part by a wall surface of the cavity, which wall surface surrounds and at least partially abuts against the lateral surface of the functional part;
   cold-extruding the functional part by way of at least one cold-extrusion punch in the extrusion tool, which comprises a plurality of dies;
   pressing a re-working punch that protrudes into the cavity of the extrusion tool and is moveable in the longitudinal direction against the end face of the functional part so as to plastically deform the functional part and cause a material flow of material of the functional part;
   pulling the extrusion tool off of the functional part in the longitudinal direction over the free end of the functional part, while during at least a portion of the pulling the re-working punch remains pressed against the end face of the functional part, wherein the wall surface bounding the cavity is formed by at least one of the plurality of dies of the extrusion tool; and
   forcing a flow of material of the functional part as the extrusion tool is pulled off the functional part.

7. The method of claim 6 wherein the re-working punch is one of the at least one cold-extrusion punch.

8. The method of claim 6 wherein pressing the re-working punch against the end face of the functional part plastically deforms the functional part and causes a material flow of material of the functional part.

9. The method of claim 6 wherein a portion of the extrusion tool that surrounds the cavity is configured as a sleeve.

10. The method of claim 6 wherein the functional part is one of a spur gear wheel, a bearing journal, or a journal cross.

* * * * *